United States Patent [19]

Ezekiel

[11] 4,135,822
[45] Jan. 23, 1979

[54] LASER GYROSCOPE

[75] Inventor: Shaoul Ezekiel, Lexington, Mass.

[73] Assignee: Massachusetts Institute of Technology, Cambridge, Mass.

[21] Appl. No.: 683,982

[22] Filed: May 6, 1976

Related U.S. Application Data

[63] Continuation-in-part of Ser. No. 650,325, Jan. 19, 1976, abandoned.

[51] Int. Cl.² .............................................. G01B 9/02
[52] U.S. Cl. ................................................. 356/350
[58] Field of Search ............ 356/106 LR; 331/94.5 C, 331/94.5 D, 94.5 S

[56] References Cited
U.S. PATENT DOCUMENTS
3,332,314  7/1967  Rosenthal ................... 356/106 LR Primary Examiner—McGraw Vincent P.
Attorney, Agent, or Firm—Arthur A. Smith, Jr.; Paul J. Cook

[57] ABSTRACT

A sensor for measuring inertial rotation is provided which includes a passive ring, a means for generating two beams of monochromatic electromagnetic radiation, means for passing the beams into the passive ring to form two countertravelling beams and means adapted to lock the beams entering the passive ring to the cavity resonant frequencies of the countertravelling beams. The amount and direction of inertial rotation is determined by determining the frequency of the beams entering the passive ring effected by the locking means and the frequency shift of the countertravelling beams resulting from the inertial rotation of the passive ring.

20 Claims, 4 Drawing Figures

LASER GYROSCOPE

BACKGROUND OF THE INVENTION

This application is a continuation-in-part of application Ser. No. 650,325, filed Jan. 19, 1976. now abandoned.

This invention relates to a process and apparatus for sensing inertial rotation and more particularly to a method and apparatus for sensing inertial retation which includes a laser gyroscope.

Laser gyroscopes and their use in sensing and measuring inertial rotation are well known in the art. In the laser gyroscope, two beams of coherent or monochromatic light are generated and caused to travel in opposite directions over identical circuital paths. The laser employed is a ring laser which includes a means for generating two independent beams of coherent light in the clockwise (CW) direction and in the counterclockwise (CCW) direction and at least three reflecting surfaces positioned to define the circuital path and enclosed area. When the laser is rotated, the effective path of the light beam travelling in the direction of rotation is increased while the effective path of the light beam travelling in the direction opposite the direction of rotation is decreased. The difference in path length for each light beam to return to the same point in the ring as caused by the rotation is given by Equation 1:

$$\Delta L = (4A/c)\Omega$$

wherein $\Delta L$ is the length difference caused by inertial rotation rate, $\Omega$; A is the area of the ring and c is the velocity of light. This path length difference causes a splitting of the frequencies of the two light beams given by Equation 2:

$$\Delta f = (4Af_0/cP)\Omega$$

wherein $\Delta f$ is the frequency splitting, $f_o$ is the average resonant frequency of the laser cavity and P is the ring perimeter. Thus, the resonant frequencies of the two light beams are oppositely shifted and, the difference, known as the beat frequency is a function of the rotational rate. The best frequency is measured by detecting the time-varying amplitude changes of the fringe pattern generated whe the two beams are combined on an optical detector external of the ring.

The accuracy and effectiveness of ring-laser gyroscopes are dependent primarily upon their capacity to isolate rotation of the ring laser cavity as the only phenomenon having a non-reciprocal effect upon optical path length as a function of the direction of wave propogation. That is, it is highly desirable to eliminate phenomena, other than rotation, which effect a light beam travelling in one direction differently than the light beam travelling in the opposite direction. Unfortunately, other non-reciprocal effects have invariably been encountered which require the use of biasing means to minimize their effect in comparison to the non-reciprocal effect of rotation. The primary gnonreciprocal effects, other than rotation, are (a) null-shift errors which cause a generation of a beat frequency in the absence of rotation (b) lock-in of the countertravelling light beams into a synchronous frequency at low rotation rates so that no beat frequency is generated and (c) scale factor variations resulting from dispersion of the gain medium causing the scale factor to be non-linear as a function of rotation rate and light intensity. For rotation rates below the lock-in threshold, the laser gyro is not responsive to rotations. Null-shift error, lock-in and nonlinearity of scale factor result primarily from the inclusion of a laser and lasing material within the ring laser and in the path of the countertravelling light beams. Null-shifts are nonreciprocal contributions to the index of refraction for the countertravelling beams including the Fresnel-Fizlau effect wherein the velocity of light, v, travelling through a moving medium (e.g. the lasing material) of index of refraction, n, is given by Equation 3:

$$v \equiv \frac{c}{n} \pm V(1 - \frac{1}{n^2})$$

where the plus and minus signs correspond to the case of the light travelling with and against the direction of the flow, V. For example, in a laser, when a gas discharge is sustained with a direct current, the gas flows in the discharge cavity resulting in a gas flow toward the cathode in the center of the discharge and a flow toward the anode in the vicinity near the laser cavity walls. This flow produces a shift in the index of refraction that depends upon the relative directions of the laser energy and the gas flow. Thus, the laser cavity appears longer in one direction than in the other direction resulting in a null-shift in the input rotation rate sensed by the gyro.

The primary contribution to undesirable non-reciprocal effects of lock-in also results from the inclusion of a laser and lasing medium within the ring laser and in the path of the countertravelling light beams. Coupling arises from the mutual scattering of the light beams into each other caused primarily by the molecules comprising the lasing medium.

Prior attempts to overcome null-shift errors, lock-in and scale factor nonlinearity are based upon the introduction of biasing instruments, which also produce undesirable additional error sources from the properties and stabilities of the biasing instrument. Exemplary sources of biasing include Fresnel effect devices or a constant speed motor to maintain the laser above the rotational threshold for lock-in. Another approach comprises oscillating the laser through a small angle at a high rate to obtain a continuously changing bias of known amplitude and frequency. However, during two intervals of each oscillation cycle, the rotation rate falls below the lock-in threshold rotation rate during which no useful information regarding non biasing rotation is obtained.

It would be desirable to provide a process and apparatus for measuring inertial rotation which include a laser gyroscope that does not require biasing means to reduce the adverse effects of null-shift error and lock-in. Furthermore, it would be desirable to provide such a means which has high accuracy in measuring extremely small or large rotation rates.

SUMMARY OF THE INVENTION

In accordance with this invention, there is provided a laser gyro capable of sensing inertial rotation of a passive ring having two countertravelling beams of monochromatic light while eliminating errors caused by nullshift, lock-in or scale factor variations. Two laser beams are introduced into the passive ring to form two countertravelling light beams around the ring. Each laser beam introduced into the ring has a frequency equal to the resonant cavity frequency of one of the countertravelling beams. The shift is resonant frequency of the countertravelling beams caused by rotation of the passive ring is monitored by servo means which independently lock the frequency of each laser beam entering the ring to the center of the cavity resonant frequency of at least one of the countertravelling waves. The difference in resonant frequency shift of the two countertravelling waves is continuously monitored by measuring the frequency of the laser beams entering the ring either directly or indirectly and comparing these measured frequencies. By the term "passive ring" as used herein is meant a closed path for the travel of light which does not contain a laser or a gain medium. Since this invention eliminates the need for a laser gain section in the laser ring, the major causes of lock-in and null-shift as errors also are eliminated. In addition, since gain medium is not present in the ring laser, scale factor variations are eliminated. Accordingly, this invention provides a laser gyro which has far greater accuracy and sensitivity, particularly when measuring small rotation rates as compared to the laser gyros and the processes for utilizing the laser gyros of the prior art. Furthermore, since the laser is external of the closed ring any laser can be employed including gas lasers such as carbon dioxide or helium-neon lasers, solid lasers such as ruby lasers and semiconductor lasers such as gallium-arsenide lasers.

DESCRIPTION OF SPECIFIC EMBODIMENTS

Figure 1:
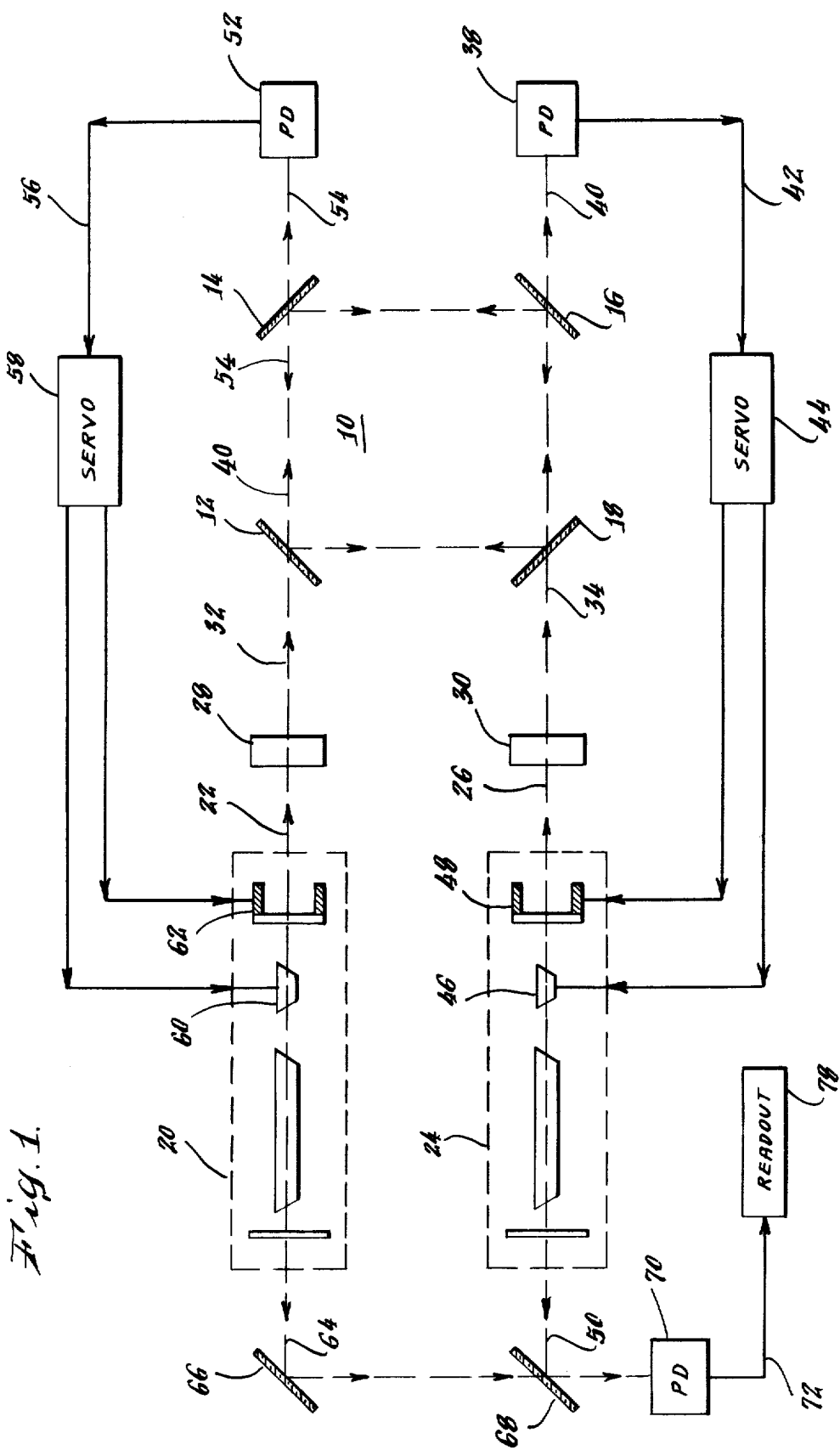
FIG. 1 is a schematic drawing of one embodiment of this invention employing two lasers for producing two countertravelling light beams of different frequencies.

Referring to FIG. 1 there is provided a passive laser ring 10 such as is employed in a Fabry-Perot interferometer which is provided with partially reflective corner mirrors 12, 14, 16 and 18 set at substantially 45° to the impinging radiation which results in a closed loop wherein light beams traverse the same path but in opposite directions. Laser 20 is tuned to establish a monochromatic light beam 22, having a frequency, $f_1$, which propogates resonantly clockwise around passive ring 10. Laser 24 is tuned to establish a monochromatic light beam 26 having a frequency $f_2$, which propogates resonantly counterclockwise around passive ring 10. The apparatus of FIG. 1 is provided with optical isolators 28 and 30 such as polarizers wherein the polarization of light beams 22 and 26 can be oriented orthogonally to each other thereby reducing their mutual interference within passive ring 10. Isolators 28 and 30 prevent reflectance of polarized light beam 32 into the laser 20 and 24 so that lock-in within the laser cavities which may be induced by such reflectance is eliminated. Isolators 28 and 30 are not required in this invention since lock-in problems associated with the prior art are eliminated by this invention even without the isolators 28 and 30.

Thus, since the ring is passive, the paths of the countertravelling waves can be slightly displaced from each other to avoid undesirable coupling or lock-in.

Polarized light beam 32, at the resonant frequency of the ring cavity, enters passive ring 10 through partially reflective mirror 12 and forms a clockwise resonant travelling light beam 40 having a frequency, $f_1$, around passive ring 10 when reflected from mirrors 14, 16, 18 and 12, respectively. Similarly, polarized light beam 34, at the resonant frequency of the ring cavity, enters passive ring 10 through partially reflective mirror 18 and forms a counterclockwise resonant travelling light beam 54 having a frequency, $f_2$, around passive ring 10 when reflected from mirrors 16, 14, 12 and 18 respectively. When the passive ring 10 is at rest, the countertravelling light beams 40 and 54 will travel at their incoming respective frequencies, $f_1$ or $f_2$ so that a beat frequency produced by their combination remains unchanged. However, when the passive ring 10 is rotated, the resonant frequencies of beams 40 and 54 shifts by an amount and in the direction corresponding to the amount and direction of rotation because the equivalent length path around passive ring 10 is not the same for the two beams 40 and 54. For example, when passive ring 10 is rotated clockwise or in a direction having a clockwise component, beam 40 will oscillate at a frequency, $f_3$, which is less than its incoming frequency, $f_1$, and the counterclockwise beam 54 will oscillate at a frequency, $f_4$, which is greater than its incoming frequency, $f_2$.

As shown in FIG. 1, a photodector 38 is aligned with the output light beam 54 which is the portion of the counterclockwise beam passing through mirror 16. Photodetector 38 generates an output electrical signal 42 which is proportional to the frequency, $f_4$, of beam 54. The signal 42 is coupled to a servodriver 44 which in turn is coupled with electro-optical crysal 46 and piezoelectric crystal 48. The signals generated from servodriver 44 to crystal 46 and crystal 48 correspond to output frequency $f_4$ thereby causing the crystals 46 and 48 to change the frequency of light beam 26 from its original frequency, $f_2$, to the new cavity resonance frequency, $f_4$, and to change the frequency of the output light beam 50 from the laser 24 to $f_4$ which is the new cavity resonance frequency of the counterclockwise light beam 54 in the passive ring 10. Similarly, a photodetector 52 is aligned with the output light beam 40 which is the portion of the clockwise beam passing through mirror 14. Photodetector 52 generates an output electrical signal 56 which is proportional to the frequency, $f_3$ of beam 40. The signal 56 is coupled to a servodriver 58 which in turn is coupled with electro-optical crystal 60 and piezoelectric crystal 62. The signal generated from servodriver 58 to crystals 60 and 62 change the frequency of light beam 22 from its original frequency, $f_1$, to the new cavity resonance frequency, $f_3$, and to change the frequency of the output light beam 64 from the laser 20 to $f_3$, which is the new cavity resonance frequency of the clockwise light beam in the passive ring 10. Thus, the servo loops serve to lock the frequency of each laser beam 32 and 34 to the center of the correspondingly cavity resonant frequencies of the countertravelling beams 40 and 54 respectively. The intra-cavity electro-optical crystals 46 and 60 are used as fast length transducers and the piezoelectric crystals 48 and 62 act as slow transducers. If desired, laser intensity stabilization can be accomplished by external electro-optic techniques.

Light beam 64 is reflected from mirror 66 through partially reflective mirror 68 to photodetector 70. Light beam 50 is reflected by mirror 68 to photodetector 70. Mirrors 66 and 68 are disposed so that beams 64 and 50 are substantially parallel at their incidence on photodetector 70. Photodetector 70 then is coupled with any means for measuring the beat frequency $f_5$ and which relates the frequency $f_5$ to the rotation rate of passive ring 10. Photodetector 70, for example, can have a square law detection characteristic for which the output will be an electrical signal 72 containing a frequency component equal to $(f_3 - f_4) = f_5$. Since the sign of the signal $f_5$ establishes the direction of rotation suitable means such as quadrature phase detection can be utilized to establish the sign. Any conventional readout means 78 can be provided which correlates the beat frequency or a frequency generated from the beat frequency to rotation rate of passive ring 10.

Figure 2:
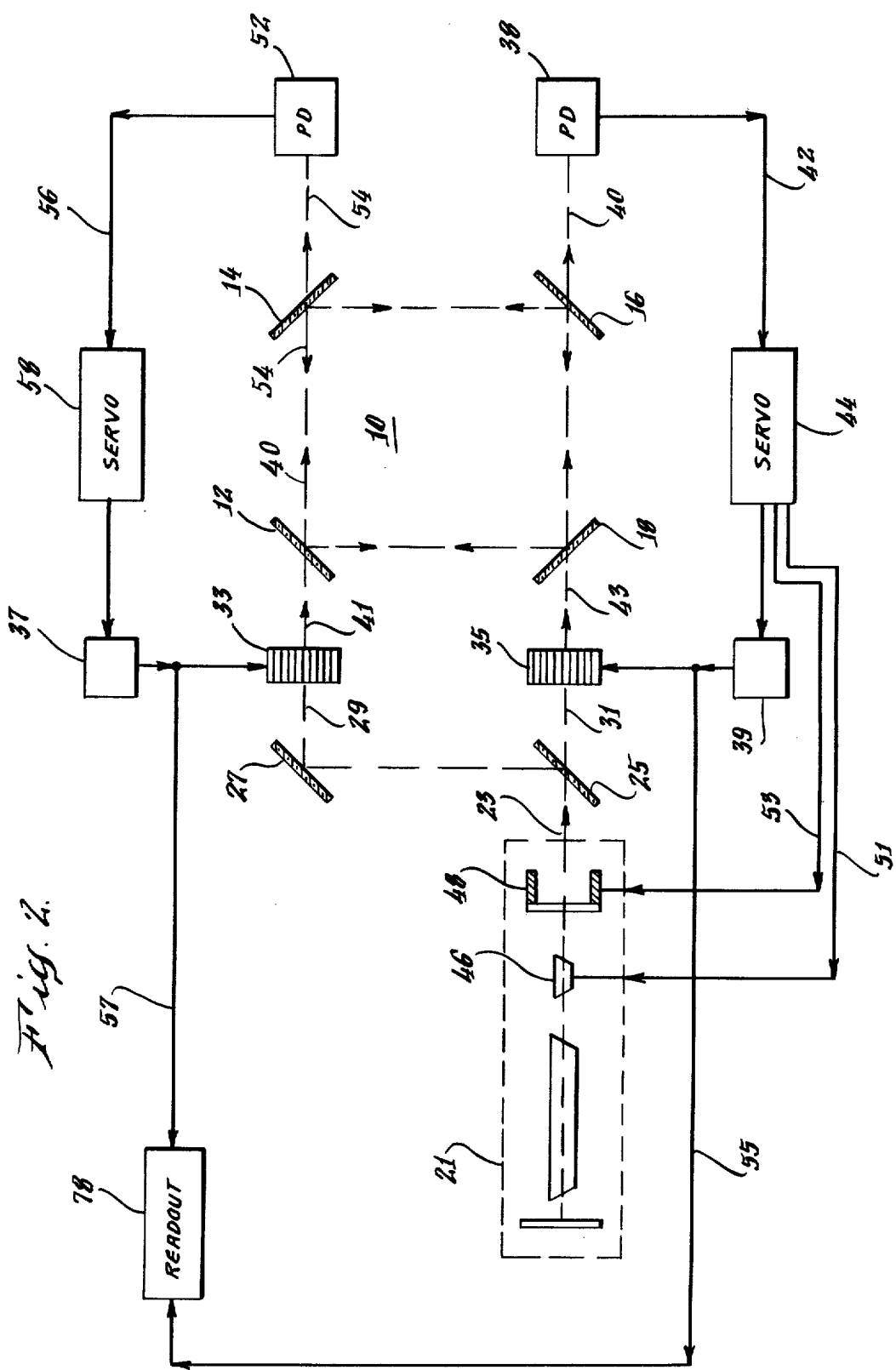
FIG. 2 is a schematic drawing of another embodiment of this invention employing one laser for producing two countertravelling light beams of different frequencies.

In FIG. 2, the numbered components having the same numbering as in FIG. 1 are the same components as identified above. Referring to FIG. 2, the apparatus is provided with a passive ring 10, photodetectors 52 and 38 for converting the frequency of light beams 40 and 54 into electrical signals 42 and 56 to actuate servodrivers 44 and 58. The laser 21 is tuned to provide, in combination with crystals 33 and 35, monochromatic light beams 41 and 43 which will oscillate resonantly around passive ring 10. Beam 23 is partially reflected by mirrors 25 and is reflected by mirror 27 to form light beam 29. The portion of light beam 23 passing through mirror 25 comprises light beam 31 having the same frequency, $f_1$, as beam 29. Acousto-optical crystals 33 and 35, or any other equivalent means are positioned in the paths of light beams 29 and 31, respectively. The crystals 33 and 35 are adapted to be electrically driven by variable crystal oscillators 37 and 39 respectively. The drive crystal 33 generates a light beam 41 having a frequency $f_2$. Beam 41 enters passive ring 10 through mirror 12 to form the clockwise light beam 40 and beam 43 enters passive ring 10 through mirror 18 to form the counterclockwise light beam 54. The crystals 33 and 35 also function as isolators in that they prevent the counterclockwise and clockwise beams from reentering the cavity of the laser 21 thereby preventing lock-in within the laser cavity. Rotation of passive ring 10 induces a change in resonant frequency of clockwise beam 40 to a new frequency, $f_3$, and induces a change in resonant frequency of counterclockwise beam 54 to a new frequency, $f_4$. Control of the servodrivers 44 and 58 by the output light beams 40 and 54 occurs in the same manner as discussed above for FIG. 1. Servodriver 58 generates an electrical signal to crystal oscillator 37 which generates a signal to crystal 33 so that it generates a light beam 41 having a frequency, $f_3$, equal to the new cavity resonance frequency of the clockwise beam. Similarly, crystal 35 is driven by servodriver 44 and crystal oscillator 39 to generate a light beam 43 having a frequency, $f_4$, equal to the new cavity resonance frequency of the counterclockwise beam. Because of the relatively small dynamic range of the voltage crystal oscillations (10 to 100 MHz), feedback loops 51 and 53 to electro-optical crystal 46 and piezoelectric crystal 48, are provided to compensate for any laser drift. The signals 55 and 57 generated from crystal osillators 37 and 39 are proportional to the new cavity resonance frequencies, $f_3$ and $f_4$ and are used to generate a beat frequency that depends only upon the difference between the frequencies, $f_3$ and $f_4$. The beat frequency can be related to rotation rate by any means well known in the art. Alternatively, the beat output of the crystal oscillators simply can be obtained by subtracting the frequency outputs driving the crystals 33 and 35.

Figure 3:
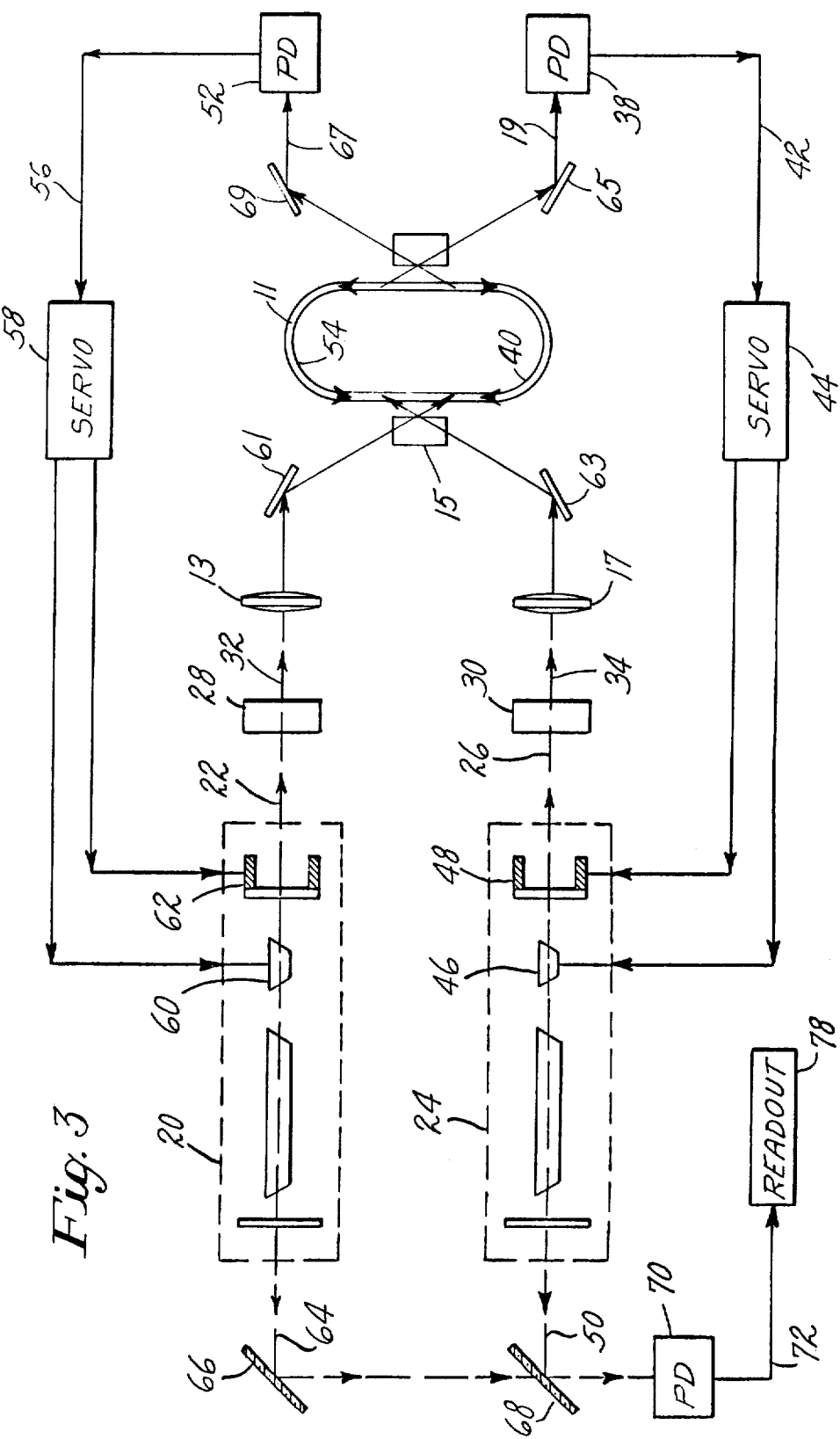
FIG. 3 is a schematic drawing of the embodiment of this invention employing two lasers and an optical fiber as the passive ring.
Figure 4:
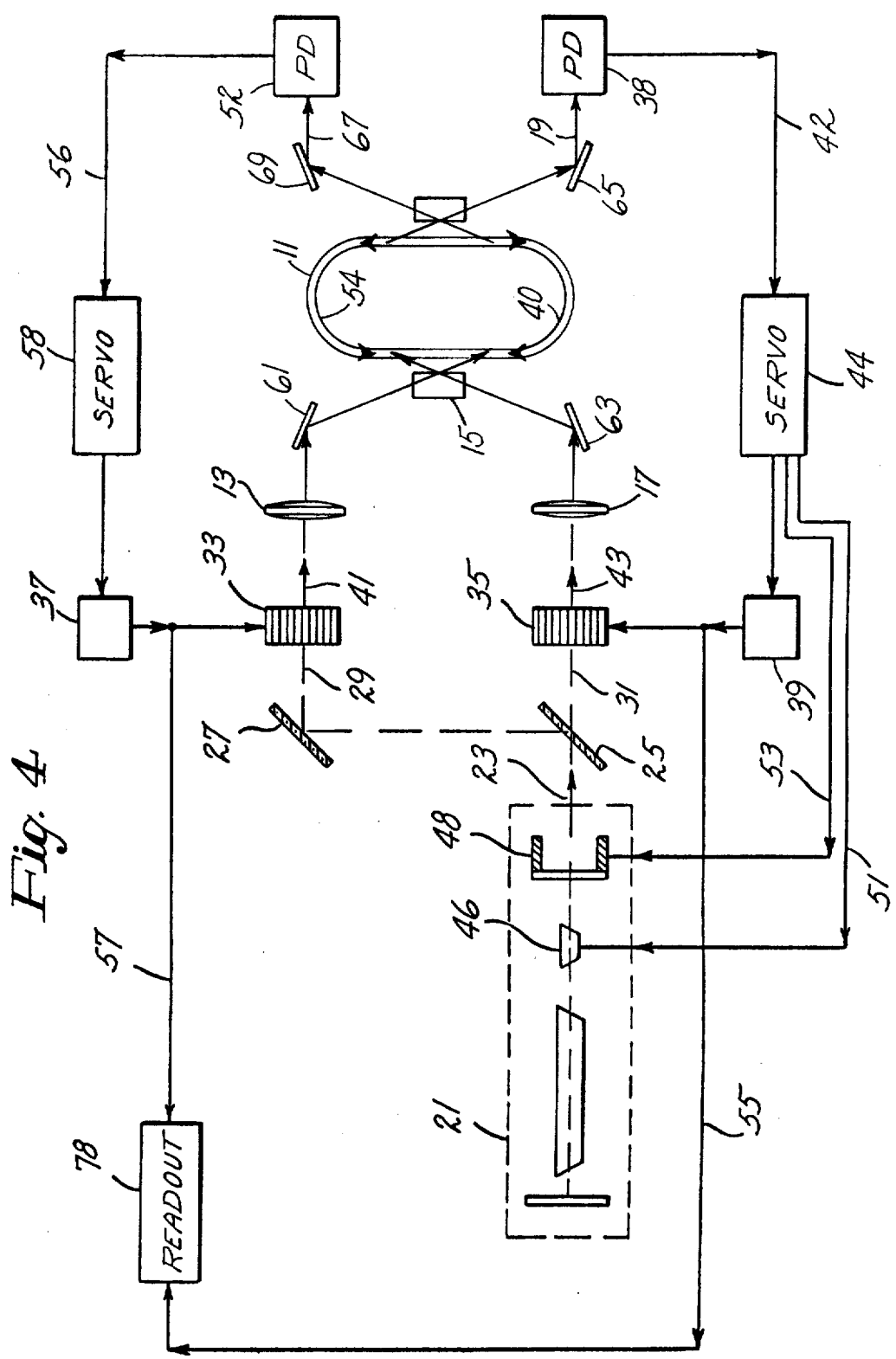
FIG. 4 is a schematic drawing of the embodiment of this invention employing one laser and an optical fiber as the passive ring.

In FIGS. 3 and 4, the numbered components having the same numbering as in FIGS. 1 and 2 are the same components as identified above. Referring to FIG. 3, there is provided a closed optical fiber 11 wherein light beams traverse the same path but in opposite directions. Laser 20 is tuned to establish a monochromatic light beam 22, having a frequency $f_1$, which propogates resonantly clockwise within optical fiber 11. Laser 24 is tuned to establish a monochromatic light beam 26, having a frequency $f_2$, which propogates resonantly counter-clockwise within optical fiber 11. The apparatus of FIG. 3 is provided with optical isolators 28 and 30 such as polarizers wherein the polarization of light beams 22 and 26 can be oriented orthogonally to each other thereby reducing their mutual interference within optical fiber 11. Isolators 28 and 30 prevent reflectance of polarized light beam 32 into the laser 20 and 24 on that lock-in within the laser cavities which may be induced by such reflectance is eliminated. Isolators 28 and 30 are not required in this invention since lock-in problems associated with the prior art are eliminated by this invention even without the isolators 28 and 30. Thus, since the optical fiber ring is passive, the paths of the countertravelling waves can be slightly displaced from each other to avoid undesirable coupling or lock-in.

Polarized light beam 32, at the resonant frequency of the ring cavity, is passed through lens 13 to mirror 61 through conventional prism coupler 15 and then is transmitted to optical fiber 11 to form a counter-clockwise resonant travelling light beam 54 having a frequency, $f_1$, around optical fiber 11. Similarly, polarized light beam 34, at the resonant frequency of the ring cavity is passed through lens 17 to mirror 63 into the prism coupler 15 and thence is transmitted to optical fiber 11 to form a clockwise resonant travelling light beam 40 having a frequency, $f_2$, within optical fiber 11. When the optical fiber 11 is at rest, the countertravelling light beams 40 and 54 will travel at their incoming respective frequencies, $f_1$ or $f_2$ so that a beat frequency produced by their combination remains unchanged. However, when the optical fiber 11 is rotated, the frequencies of beams 40 and 54 shift by an amount and in the direction corresponding to the amount and direction of rotation because the equivalent length path within optical fiber 11 is not the same for the two beams 40 and 54.

As shown in FIG. 3, a photodector 38 is aligned to to capture beam 19 reflected from mirror 65 to pick up beam 40 so that beam 40 is transmitted to photodector 38. Photodector 38 generates an output electrical signal 42 which is proportional to the frequency, $f_4$, of beam 40. The signal 42 is coupled to a servodriver 44 which in turn is coupled with electro-optical crystal 46 and piezoelectric crystal 48. The signals generated from servodriver 44 to crystal 46 and crystal 48 correspond to output frequency, $f_4$, thereby causing the crystals 46 and 48 to change the frequency of light beam 26 from its original frequency, $f_2$, to the new cavity resonance frequency, $f_4$, and to change the frequency of the output light beam 50 from the laser 24 to $f_4$ which is the new cavity resonance frequency of the counter-clockwise light beam 40 in the optical fiber 11. Similarly, a photodector 52 is aligned to capture beam 67 reflected from mirror 69 to pick up the output light beam 54. Photodector 52 generated an output electrical signal 56 which is proportional to the frequency, $f_3$, of beam 54. The signal 56 is coupled to a servodriver 58 which in turn is coupled with electro-optical crystal 60 and piezoelectric crystal 62. The signal generated from servodriver 58 to crystals 60 and 62 change the frequency of light beam 22 from its original frequency, $f_1$, to the new cavity resonance frequency, $f_3$, and to change the frequency of the output light beam 64 from the laser 20 to $f_3$, which is the new cavity resonance frequency of the clockwise light beam within the optical fiber 11. Thus, the servo loops serve to lock the frequency of each laser beam 32 and 34 to the center of the corresponding cavity resonant frequencies of the countertravelling beams 40 and 54 respectively. The intra-cavity electro-optical crystals 46 and 60 are used as fast length transducers and the piezoelectric crystals 48 and 62 act as slow transducers. If desired, laser intensity stabilization can be accomplished by external electro-optic techniques.

Light beam 64 is reflected from mirror 66 through partially reflective mirror 68 to photodector 70. Light beam 50 is reflected by mirror 68 to photodector 70. Mirrors 66 and 68 are disposed so that beams 64 and 50 are substantially parallel at their incidence on photodector 70. Photodector 70 then is coupled with any means for measuring the beat frequency, $f_5$, and which relates the frequency, $f_5$, to the rotation rate of optical fiber 11. Any conventional readout means 78 can be provided which correlates the beat frequency or a frequency generated from the beat frequency to rotation rate of passive ring 10.

Referring to FIG. 4, the apparatus is provided with the optical fiber 11, photodectors 52 and 38 for converting the frequency of light beams 40 and 54 into electrical signals 42 and 56 to actuate servodrivers 44 and 58. The laser 21 is tuned to provide, in combination with crystals 33 and 35, monochromatic light beams 41 and 43 which will oscillate resonantly within optical fiber 11. Beam 23 is partially reflected by mirror 25 and is reflected by mirror 27 to form light beam 29. The portion of light beam 23 passing through mirror 25 comprises light beam 31 having the same frequency, $f_1$, as beam 29. Acousto-optical crystals 33 and 35, or any other equivalent means are positioned in the paths of light beams 29 and 31, respectively. The crystals 33 and 35 are adapted to be electrically driven by variable crystal oscillators 37 and 39 respectively. The drive crystal 33 generates a light beam 41 having a frequency $f_2$. Beam 41 is passed through lens 13 to mirror 61 through conventional prism coupler 15 and then is transmitted to optical fiber 11 to form a counter-clockwise resonant travelling light beam 54 having a frequency $f_1$. Similarly, light beam 43 at the resonant frequency of the ring cavity is passed through lens 17 to mirror 63 into the prism coupler 15 and thence is transmitted to optical fiber 11 to form a clockwise resonant travelling light beam 40 having a frequency, $f_2$, within optical fiber 11. The crystals 33 and 35 also function as isolators in that they prevent the counterclockwise and clockwise beams from reentering the cavity of the laser 21, thereby preventing lock-in within the laser cavity. Rotation of passive ring 11 induces a change in the resonant frequency of clockwise beam 40 to a new frequency, $f_3$, and induces a change in the resonant frequency of counter-clockwise beam 54 to a new frequency, $f_4$. Control of the servodrivers 44 and 58 by the output light beams 40 and 54 occurs in the same manner as discussed above for FIG. 1. Servodriver 58 generates an electrical signal to crystal oscillator 37 which generates a signal to crystal 33 so that it generates a light beam 41 having a frequency, $f_3$, equal to the new cavity resonance frequency of the clockwise beam. Similarly, crystal 35 is driven by servodriver 44 and crystal oscillator 39 to generate a light beam 43 having a frequency, $f_4$, equal to the new cavity resonance frequency of the counter-clockwise beam. Because of the relatively small dynamic range of the voltage crystal oscillations (10 to 100 MHz), feedback loops 51 and 53 to electro-optical crystal 46 and piezoelectric crystal 48, are provided to compensate for any laser drift. The signals 55 and 57 generated from crystal oscillators 37 and 39 are proportional to the new cavity resonance frequencies, $f_3$ and $f_4$, and are used to generate a beat frequency that depends only upon the difference between the frequencies, $f_3$ and $f_4$. The beat frequency can be related to rotation rate by any means well known in the art. Alternatively, the beat output of the crystal oscillators simply can be obtained by subtracting the frequency outputs driving the crystals 33 and 35.

The apparatus shown in FIG. 2 is the preferred embodiment of this invention since it requires the use of only one laser thereby reducing any errors that may be introduced by laser jitter. In addition, the embodiment shown in FIG. 2 can be modified so that only one acousto-optical crystal is driven in response to the frequency of either the clockwise or counterclockwise light beams while the frequency of the light beam not so regulated is determined as in FIG. 1. Alternatively, one acousto-optical crystal as well as the electro-optical crystal and piezoelectric crystal of the laser can be driven by the servos, each in response to the frequency of either the clockwise or counterclockwise beams. All that is necessary is that means be provided for introducing a countertravelling light beam into the passive ring and that feedback loops be provided to lock the source of the input light beams or to lock a means intermediate the light source and the passive ring to the cavity resonance frequencies of the countertravelling light beams imposed by rotation of the passive ring.

In another aspect of this invention measurement of the resonant frequency shift within the passive ring can be made by measuring light intensity change at a given time as a function of rotation rate of the passive ring. For example, a Faraday cell can be included in the closed path for the light beams and coupled to any means for measuring the resonant frequency shift of the countertravelling beams. The Faraday cell is activated to cause a frequency shift of one of the countertravelling waves in an amount equal to but in a direction opposite the resonant frequency shift caused by rotation. The electrical input to the Faraday cell to effect this latter frequency shift is measured and converted to actual rotation rate. The inclusion of the Faraday cell in the closed path does not cause the problems of lock-in, null-shift error and scale factor nonlinearity since the Faraday cell does not contain a gain medium.

In the process of this invention, two beams of monochromatic light are introduced into and oscillated resonantly around the passive ring. When the passive ring is subjected to inertial rotation, the shift in resonant frequency of each countertravelling wave is used to regulate a modulating means which functions to change the frequency of at least one light beam entering the passive ring as a source of one countertravelling wave to equal the frequency shift of that countertravelling wave and to equal the new cavity resonant frequency of that countertravelling wave. The new frequencies of the countertravelling wave or waves resulting from the inertial rotation of the passive ring are measured to measure the frequency shift and to determine the amount and direction of inertial rotation. For example, when employing a passive ring 10cm on a scale and an instrumental line width of the passive ring of 1 MHz, a laser power of 1mW, a Fabray-Perot on-resonance transmission of 1%, a photodetector quantum efficiency of 50%, an integration time of only about 450 seconds is required to detect a milliearth rate. Improved performance can be obtained when employing a wideband feedback loop of greater than 1 MHz, e.g. about 10 MHz to reduce the noise that may be caused by laser jitter.

While the invention has been described above with reference to a ring having four mirrors, it is to be understood that three or more mirrors can be employed to form a passive ring. While the invention may utilize any type of laser to produce monochromatic light, it is preferred to employ a solid state laser such as a gallium arsenide laser due to their small size.

In another aspect of this invention, the passive ring comprising an open space and a plurality of mirrors as described above can be replaced by a thin optical fiber to form the desired passive ring for the countertravelling light waves. The optical fiber should be sufficiently thin so as to allow the propagation of only one radial mode of the light waves within the fibers. The optical fiber is coupled with a conventional coupling means such as a prism coupler to introduce the light into the fiber and to remove the light from the fiber for readout. The remainder of the laser gyroscope construction is produced in the manner described above. This embodiment is advantageous in that it eliminates the need for mirror alignment.

What is claimed is:

1. A sensor for measuring inertial rotation which comprises:
    a. means for reflecting monochromatic electromagnetic radiation in a closed path comprising a passive ring,
    b. generating means for forming two beams of monochromatic electromagnetic radiation, said generating means being positioned to cause said beams to enter said closed path and to pass in resonance around said closed path in opposite directions,
    c. monitoring means for monitoring the resonant frequency shift of each of said beams within the closed path caused by inertial rotation of said closed path, and
    d. means responsive to said monitoring means adapted to control said generating means to change the frequency shift of at least one beam of monochromatic electromagnetic radiation to equal the resonant frequency of at least one of the beams within the closed path.

2. The apparatus of claim 1 wherein the generating means comprises two lasers.

3. The apparatus of claim 1 wherein the generating means comprises one laser and means for shifting the frequency of electromagnetic radiation positioned between the laser and the closed path and in the path of each of the beams entering the closed path.

4. The apparatus of claim 3 including electromagnetic radiation isolating means positioned between each of said frequency shifting means and said closed ring, wherein each isolating means is adapted to prevent reflection of electromagnetic radiation from said closed ring into said laser.

5. The apparatus of claim 2 including electromagnetic radiation isolating means positioned between each of said lasers and said closed ring wherein each isolating means is adapted to prevent reflection of electromagnetic radiation from said closed ring into said lasers.

6. The apparatus of claim 1 wherein the laser is a semiconductor laser.

7. The apparatus of claim 2 wherein at least one laser is a semiconductor laser.

8. The apparatus of claim 1 wherein the passive ring comprises a closed thin optical fiber.

9. The apparatus of claim 2 wherein the passive ring comprises a closed thin optical fiber.

10. The apparatus of claim 3 wherein the passive ring comprises a closed thin optical fiber.

11. The apparatus of claim 4 wherein the passive ring comprises a closed thin optical fiber.

12. The apparatus of claim 5 wherein the passive ring comprises a closed thin optical fiber.

13. The apparatus of claim 6 wherein the passive ring comprises a closed thin optical fiber.

14. The apparatus of claim 7 wherein the passive ring comprises a closed thin optical fiber.

15. The apparatus of claim 1 wherein said passive ring includes a Faraday cell.

16. The apparatus of claim 2 wherein said passive ring includes a Faraday cell.

17. The apparatus of claim 3 wherein said passive ring includes a Faraday cell.

18. The process for measuring inertial rotation which comprises generating two beams of monochromatic light in a passive ring resonantly in a closed path in opposite directions monitoring the frequency shift of each beam within said passive ring caused by rotation of said passive ring and changing the frequency of at least one of said beams in response to the frequency monitored to equal the new resonant frequency of at least one of said beams within said passive ring caused by said rotation.

19. The process of claim 1 wherein the two beams are generated from one laser and wherein a frequency shifting means is positioned in each beam between the laser and the closed ring and wherein at least two means selected from the group consisting of the laser and the two frequency shifting means are modulated to cause each of the two beams to have a frequency shift equal to the frequency shift of the corresponding countertravelling beams within the ring and determining the amount of each of said modulations.

20. The process of claim 18 wherein the two beams are generated from two lasers and modulating the two lasers to cause each of the two beams to have a frequency equal to the resonant frequency of each of the corresponding countertravelling beams within the ring caused by rotation of the ring and determining the amount of each of said modulations.

* * * * *